No. 815,033.  
PATENTED MAR. 13, 1906.  
J. PAULL & A. G. NEVILLE.  
GLASS ARTICLE.  
APPLICATION FILED SEPT. 18, 1905.
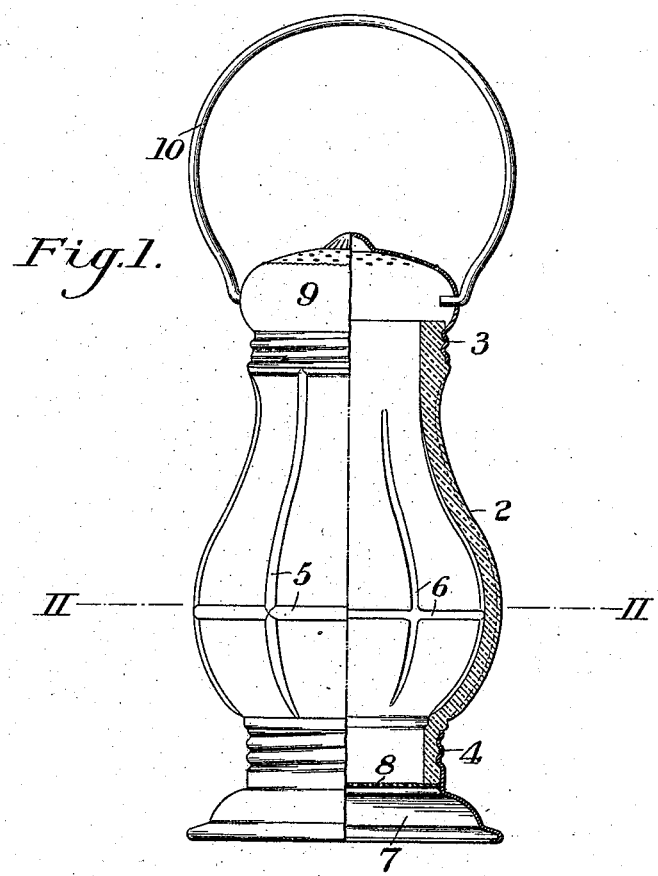
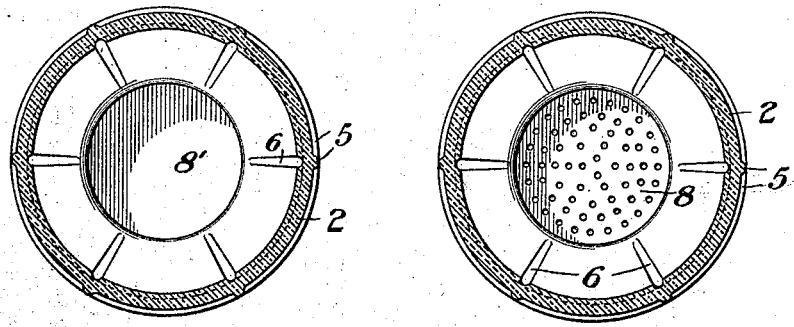
WITNESSES  
INVENTORS

UNITED STATES PATENT OFFICE.

JAMES PAULL AND ASA G. NEVILLE, OF WELLSBURG, WEST VIRGINIA, ASSIGNORS TO EAGLE GLASS & MANUFACTURING COMPANY, OF WELLSBURG, WEST VIRGINIA, A CORPORATION OF WEST VIRGINIA.

GLASS ARTICLE.

No. 815,033.  Specification of Letters Patent.  Patented March 13, 1906.

Application filed September 18, 1905. Serial No. 278,891.

*To all whom it may concern:*

Be it known that we, JAMES PAULL and ASA G. NEVILLE, of Wellsburg, Brooke county, West Virginia, have invented a new and useful Glass Article, of which the following is a full, clear, and exact description, reference being had to the accompanying drawings, forming part of this specification, in which—

Figure 1 is a side elevation, partly in section, of our improved glass article. Fig. 2 is a cross-section on the line II II of Fig. 1; and Fig. 3 is a cross-section similar to Fig. 2, showing a modified form.

Our invention is designed to provide a new and attractive glass receptacle which may be cheaply made in large quantities.

In the drawings, 2 represents the lantern-shaped glass body of the article, which is open at both ends and is provided with external screw-threads 3 and 4 at its top and bottom. This body also has external ribs 5 and corresponding external grooves 6, said ribs and grooves being formed in the process of blowing the blank from which the body is made to give it its expanded form, by which operation the lower screw-threads 4 may also be formed.

A sheet-metal base 7, having an upper screw-threaded portion, is secured upon the lower screw-threaded base of the glass receptacle, this base having a suitable closure or bottom 8 secured therein to close the bottom of the glass receptacle. This closure 8 may be in the form of a disk, which is soldered in place, or may be of any other desirable form of suitable character to hold candy or similar material in the receptacle. The closure may be secured by seaming or by other means than soldering. A perforated screw-cap 9, also formed of sheet metal, is screwed upon the open top, and a swinging bail 10 is preferably pivoted to this cap 9.

In the form of the invention shown in Figs. 1 and 2 the bottom closure-plate 8 is provided with a series of perforations. In this form after the candy or other material sold in the article is used up the article may be used as a lantern by placing a candle within it, air being supplied through the lower holes. The article can be used as a Christmas-tree decoration or otherwise, as desired.

In the form shown in Fig. 3 the perforations are omitted and the solid bottom 8' is employed.

The advantages of our invention result from the simplicity and attractiveness of the article and from its capability of being manufactured in large quantities at small cost. The metal base, with its closure, may also be cheaply formed and attached.

Variations may be made in the size and shape of the glass receptacle and the other parts without departing from our invention.

We claim—

1. As a new article of manufacture, a lantern-shaped glass body having an open top with external screw-threads and an open bottom with external screw-threads, and an expanded intermediate portion, in combination with a metal base, screwed on the bottom of the body and carrying a closure, and a metal cap screwed to its top; substantially as described.

2. As a new article of manufacture, a glass receptacle having an open top with external screw-threads and an open bottom with screw-threads, an intermediate expanded portion provided with external ribs, a metal base provided with a metal closure screwed to the base of the receptacle, and a perforated metal cap screwed to its top; substantially as described.

3. As a new article of manufacture, a glass receptacle having an open top with external screw-threads, an open bottom, and an expanded intermediate portion with external ribs and internal corresponding recesses, a metal base screwed to the bottom and provided with a metal closure, and a perforated metal cap screwed to the top and having a bail; substantially as described.

4. As a new article of manufacture, a glass receptacle having an open top with external screw-threads, an open bottom, and an expanded intermediate portion with external ribs and internal corresponding recesses, a metal base screwed to the bottom and having a perforated metal closure, and a perforated metal cap screwed to the top and having a bail; substantially as described.

In testimony whereof we have hereunto set our hands.

JAMES PAULL.
ASA G. NEVILLE.

Witnesses:
C. B. OTT,
S. R. CALDWELL.